(12) United States Patent
Wood et al.

(10) Patent No.: US 6,335,723 B1
(45) Date of Patent: Jan. 1, 2002

(54) TRANSMITTER PEN LOCATION SYSTEM

(75) Inventors: Robert P. Wood, San Carlos; Serge Plotkin, Belmont; Jacob Harel, San Francisco; Alfred Samson Hou, Sunnyvale, all of CA (US)

(73) Assignee: Tidenet, Inc., Foster City, CA (US)

( * ) Notice: Subject to any disclaimer, the term of this patent is extended or adjusted under 35 U.S.C. 154(b) by 0 days.

(21) Appl. No.: 09/165,748

(22) Filed: Oct. 2, 1998

(51) Int. Cl.$^7$ .................................................. G09G 5/00
(52) U.S. Cl. ..................... 345/173; 345/175; 345/177; 345/179; 178/18.01
(58) Field of Search ............... 178/19.01, 19.02, 178/18.01, 18.03, 8.04, 18.02, 19.07, 18.09; 345/177, 179, 173, 174, 175, 183

(56) References Cited

U.S. PATENT DOCUMENTS

| | | | |
|---|---|---|---|
| 4,777,329 A | * 10/1988 | Mallicoat | 178/19.02 |
| 4,814,552 A | 3/1989 | Stefik et al. | 178/18 |
| 4,939,701 A | 7/1990 | Brunner et al. | 367/128 |
| 5,144,594 A | 9/1992 | Gilchrist | 367/129 |
| 5,308,936 A | * 5/1994 | Biggs et al. | 178/19.02 |
| 5,717,168 A | * 2/1998 | DeBuisser et al. | 345/179 |
| 5,729,251 A | * 3/1998 | Nakashima | 345/179 |
| 6,151,014 A | * 11/2000 | Zloter et al. | 345/177 |

FOREIGN PATENT DOCUMENTS

| | | | |
|---|---|---|---|
| EP | 312 481 A2 | 4/1989 | G06K/11/06 |
| WO | WO 94/11844 | 5/1994 | G06K/11/14 |

* cited by examiner

Primary Examiner—Regina Liang
(74) Attorney, Agent, or Firm—Michael A. Glenn

(57) ABSTRACT

A transmitter pen positioning system is provided, in which a pen, having multiple output elements, is used to accurately determine the location of the pointing tip of the pen, in relation to the writing area of a surface, such as a white board. The first output element, preferably an infrared transducer, transmits a first output signal from the transmitter pen. The second output element, preferably an ultrasonic transducer, transmits a second output signal, having a lower propagation velocity than the first output signal, from the transmitter pen to two or more receivers. In a basic embodiment, the first output signal arrives at one or more receivers generally concurrently. The second output signal, having a speed of propagation different from the speed of propagation of the first signal, is transmitted from the transmitter pen at a known time in relation to the first output signal, and arrives at each of the receivers at a time which is dependent on the velocity of the second signal and the distance between the transmitter pen and the receivers. The location of the pointing tip of the transmitter pen is then determined, by using the first signal as a boundary condition, by comparing the waveform of the second output signal to one or more stored prior second output signals to determine an accurate time of arrival, and by solving simultaneous equations. Alternative embodiments allow the transmission of supplementary information from the transmitter pen to the receivers, using either the first and/or second output signals, such as determined pen color, line color, width, and pen user identification.

91 Claims, 11 Drawing Sheets

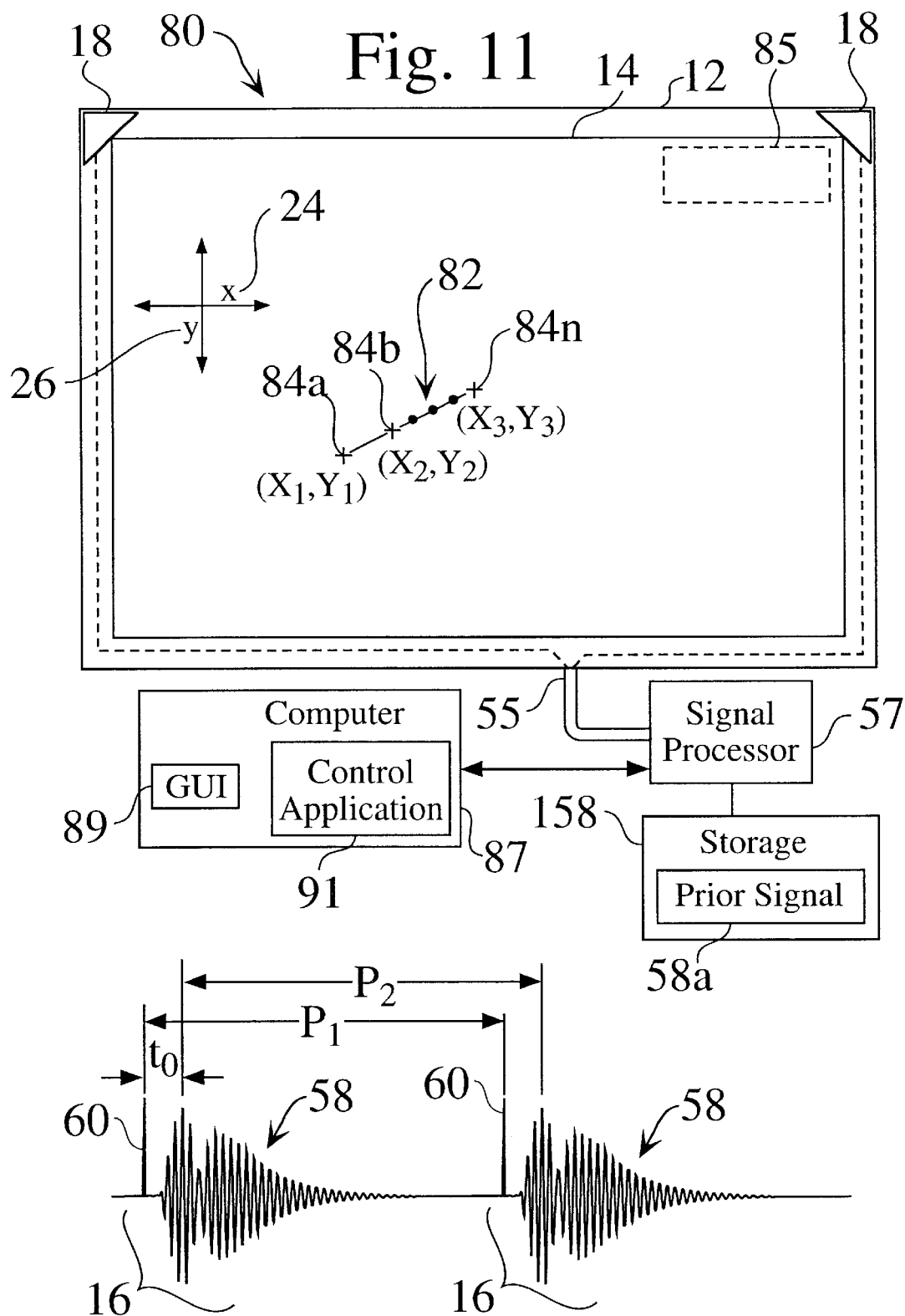

TRANSMITTER PEN LOCATION SYSTEM

FIELD OF THE INVENTION

The invention relates to the field of location algorithms for remote devices. More particularly, the invention relates to an algorithm system for determining the position of an electronic pointing device.

BACKGROUND OF THE INVENTION

Digitizing pen and whiteboard systems are used for a variety of electronic applications. These systems typically include a whiteboard, a position indicating pen, and associated electronics for determining the interaction between the whiteboard and the position indicating pen. A digital data signal is typically derived to represent the relative position of the position indicating pen and the whiteboard.

When a signal, such as ultrasound, is used as a location signal for a remote device, it is often difficult to determine the location of the device accurately, since it is difficult to determine where upon each of sequential long wavepulses to measure, as a determination of the time of arrival to external receivers.

I. Gilchrist, Acoustic Mouse System, U.S. Pat. No. 5,144,594 (Sep. 3, 1992) discloses an acoustic mouse system, which "controls indications on an X-Y surface of the face of a display. The system comprises at least three acoustic receivers in an x-y plane, and a hand movable acoustic transmitter that is movable both parallel to the x-y plane and in a z direction perpendicular to the x-y plane. The transmitter generates periodic acoustic oscillations in the direction of the support and its receivers. Detection circuitry, responsive to the signals from the acoustic receivers, provides signals indicative of the absolute position of the acoustic transmitter in the x-y plane. A processor is responsive to the signals from the detection circuitry to provide absolute position signals to the display, whereby the display responds by moving an indication to a corresponding position on the X-Y surface of the display face. The detector circuitry is further enabled to provide z position signals to the display, whereby the display may modify a display function in accordance with the z position signals". While Gilchrist discloses a generic, periodic acoustic wavelength position indicating system, Gilchrist fails to disclose a useful algorithm by which the position of the movable acoustic transmitter is determined. Furthermore, the system apparently requires a minimum of three acoustic receivers to properly locate the movable acoustic transmitter, and a minimum of four acoustic receivers to calibrate the system. Gilchrist also fails to disclose waveform analysis techniques which can be used to provide even greater accuracy in the determination of the movable acoustic transmitter. While Gilchrist discloses the preferred use of an infrared transmitter to transmit a mouse command signal or a control signal, Gilchrist fails to disclose the use of a combined signal, comprising a repeated infrared signal coupled to a repeated ultrasound signal, to more accurately locate a movable transmitter device.

M. Stefik and C Heater, Ultrasound Position Input Device, U.S. Pat. No. 4,814,552 (Mar. 21, 1989) discloses an "input device, or stylus, for entering hand drawn forms into a computer using a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infrared signal which the system receives immediately, and an ultrasound pulse which two microphones receive after a delay which is a function of the speed of sound and the distance of the stylus from the microphone". While Stefik et al. discloses an algorithm to analyze the incoming ultrasound signals to locate the stylus, the algorithm computes radii to each of the two microphones using information from only a single sonic pulse sample, translates the two radii into a calculated X,Y location, and then filters the calculated X,Y values, removing them from the described path if they vary from a specified limit, or range.

B. Edwards, Ultrasound Position Locating Method and Apparatus Therefor, U.S. Pat. No. 5,142,506 (Aug. 25, 1992) discloses a "positional locating method and apparatus for measuring distances by accurately determining the transit time of ultrasonic wave bursts between two or more points". "Timer clocks are started when each of the bursts is triggered to be emitted from a transmission point, and are stopped when a highly defined point in the burst is received at a corresponding receiving point. The highly defined point is determined by first analyzing the burst to identify a particular cycle within the burst. The particular cycle is then analyzed to detect the specific point within the cycle".

While Edwards typically uses multiple receivers to locate a transmitter using ordinary trigonometric calculations, the analog system is limited to the comparison of amplitude between a small number of measured peaks on successive cycles within "bursts" of the received ultrasonic waveform. Common variations of the waveform, typically due to ordinary use of a transmitter, either from the orientation of the transmitter to the receivers, the speed at which the transmitter is moved between different regions of a writing surface, the signal strength of the transmitted signal, or noise, can result in erroneous results. Reliance on the amplitude of a specific cycle within a pulse waveform can lead to errors of one or more cycles, resulting in position detection errors of several centimeters. Errors in such an analog system commonly result either in an inaccurate determined location for the transmitter, or in a determined location point which is required to be "thrown out" from the described path of the movable transmitter. As well, the analog system used inherently limits the type of comparison between the amplitude of selected cycle peaks within signal "bursts" within a prior output signal and a current output signal, thus preventing the analog system to being easily adaptable to hardware embodiments or improved waveform comparison techniques.

The disclosed prior art systems and methodologies thus provide basic transmitter pen and whiteboard positioning systems for determining the spatial relationship between a pen and a writing area, but fail to provide an accurate means for determining the position of the tip of the pen. It would be advantageous to provide a more accurate and reliable means to calculate the distance from a transmitter pen to external receivers, to improve the resolution of the pen by increasing the number of valid position data points, and to improve the precision and smoothness of a described path. It would also be advantageous to provide a means to store prior output signals, allowing the comparison of one or more features between the current output signal waveform and one or more prior output signal waveforms. In addition, it would also be advantageous to provide a means to customize or change the comparison between the current output signal waveform and one or more prior output signal waveforms. The development of such a transmitter pen positioning system would constitute a major technological advance.

SUMMARY OF THE INVENTION

A transmitter pen location system is provided, in which a pen is adapted to send a plurality of repeated output signals to two or more external receivers, wherein the location of the pointing tip of the pen is determined in relation to the writing area of a surface. A first output element, preferably an infrared transducer, transmits a first output signal from the transmitter pen. A second output element, preferably an ultrasonic transducer, transmits a second output signal from the transmitter pen to two or more receivers. In a basic embodiment, the first output signal arrives at one or more receivers generally concurrently. The second output signal, transmitted from the transmitter pen at a known time in relation to the first output signal, arrives at each of the receivers at a time which is dependent on the speed of propagation of the second signal. The location of the pointing tip of the transmitter pen is then determined, by using the first signal as a boundary condition, comparing the second signal to one or more stored prior second signals to determine the time of arrival of the second signal at each of the receivers, determining the distance from the pen to each of the receivers using the arrival time of the second signal compared to the arrival time of the first output signal, and then calculating a location for the pen which is consistent with the calculated distance to each of the external receivers: Alternative embodiments allow the transmission of supplementary information from the transmitter pen to the receivers, using either the first and/or second output signals.

BRIEF DESCRIPTION OF THE DRAWINGS

FIG. 11 shows a calculated transcribed path of a transmitter pen from sequential locations, and a defined functional area, within the writing area of a surface;

FIG. 12 shows a repeated combined output signal as it is sent from a transmitter pen;

DETAILED DESCRIPTION OF PREFERRED EMBODIMENTS

Figure 1:
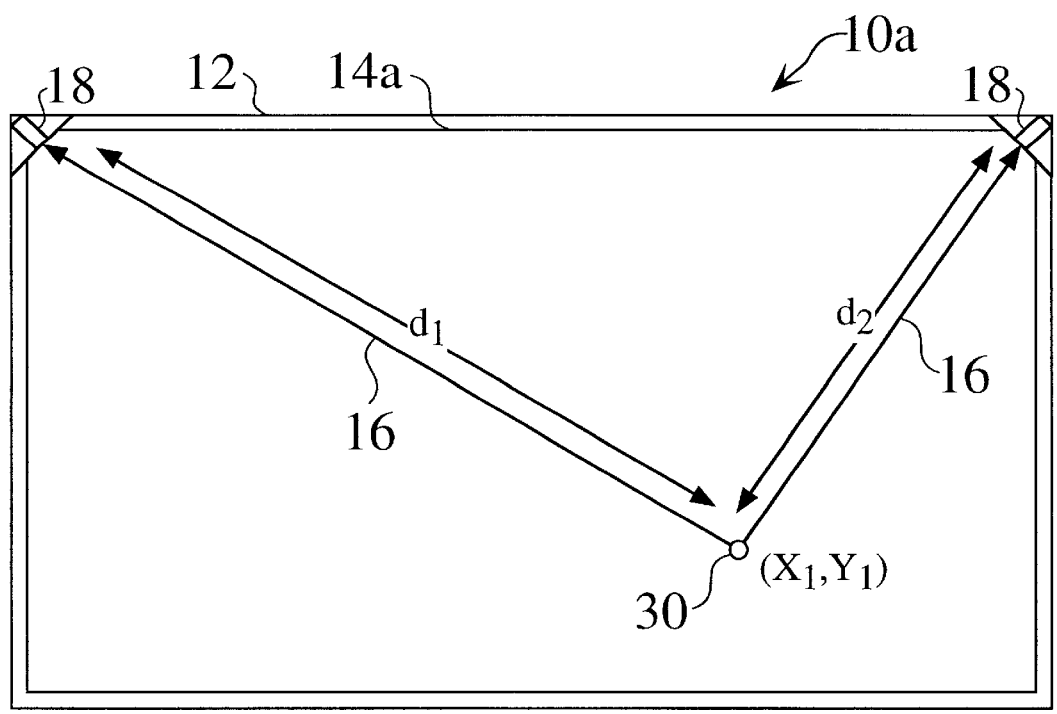
FIG. 1 is a top view of a transmitter pen location system, in which a transmitter pen is located within the writing area of a surface, and in which the transmitter pen periodically sends a combined output signal to external receivers.
Figure 2:
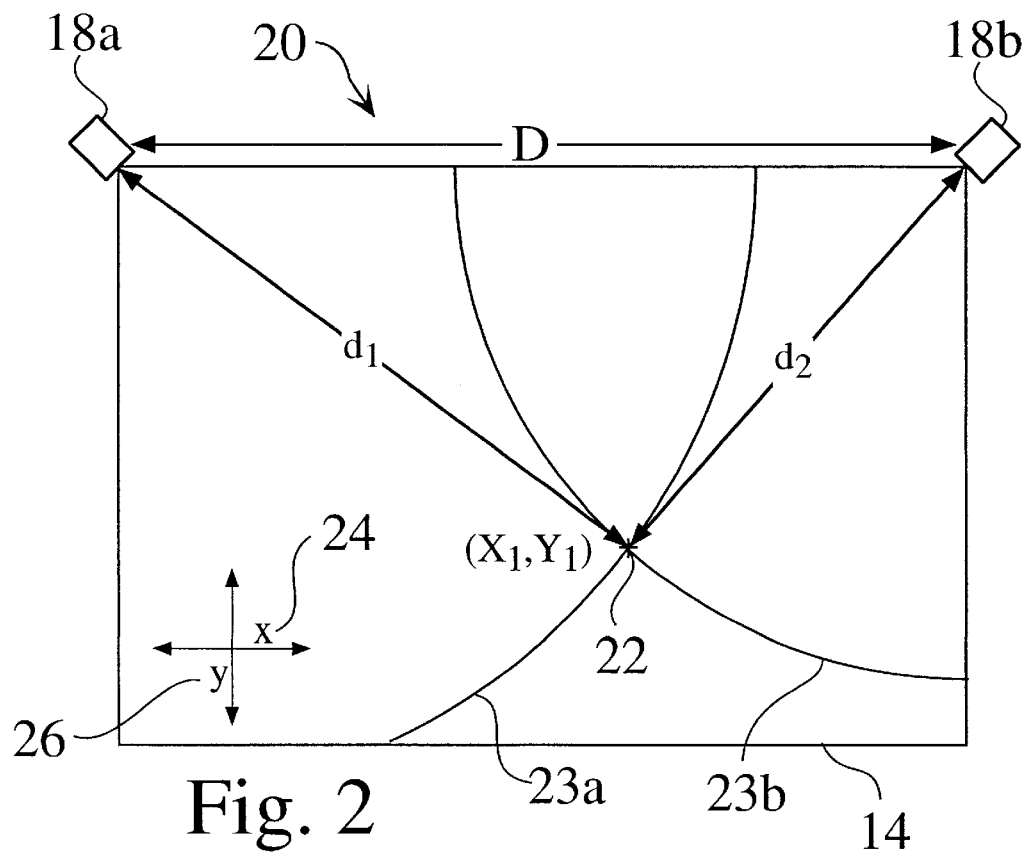
FIG. 2 shows the geometric relationship between a transmitter pen and two external receivers, with the calculated position of the pen is shown as the intersection of arc lengths.

FIG. 1 is a top view of a transmitter pen location system 10a, in which a transmitter pen 30 located within the writing area 14 of a surface 12, in which the transmitter pen 30 repeatedly sends a combined output signal 16 to external receivers 18. The surface 12 is typically a whiteboard, a blackboard, a drafting table or an overhead projector, or any kind of presentation surface. FIG. 2 shows the geometric relationship 20 between a transmitter pen 30 and two external receivers 18a and 18b, with the calculated $(X_1,Y_1)$ position of the transmitter pen 30 represented in relation to an X-axis 24 and a Y-axis 26, as discussed below.

Figure 3:
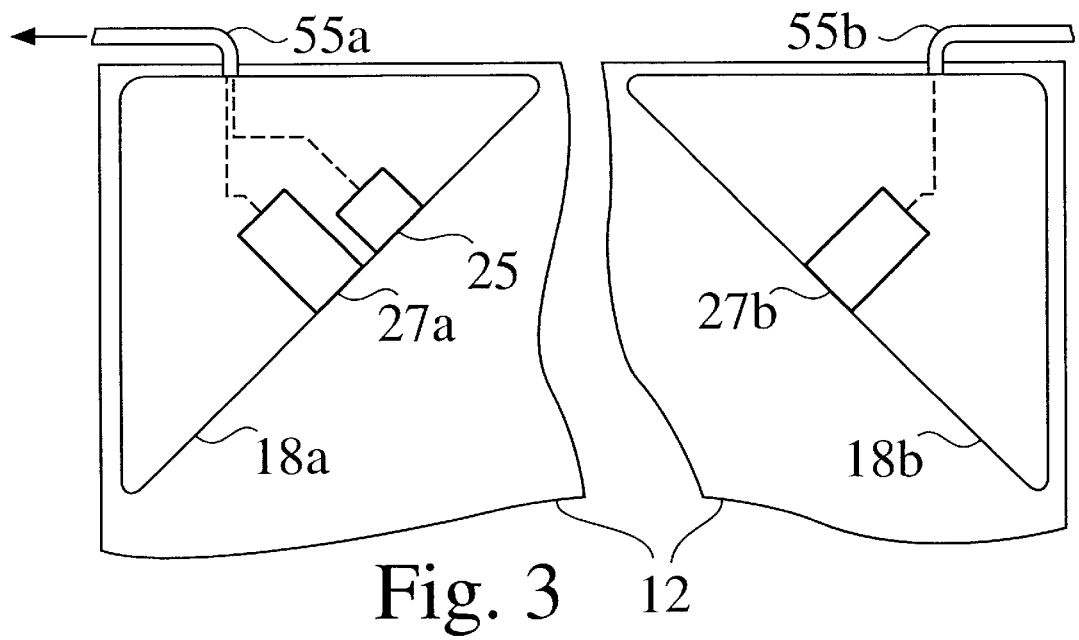
FIG. 3 is a partial top view of external receivers located on a surface.

FIG. 3 is a partial top view of external receivers 18 located on a surface 12. The first external receiver 18 includes a first output signal sensor 25 and a second output signal sensor 27a, and includes a signal connection 55a towards a signal processor 57 (FIG. 11). The second external receiver 18 includes a second output signal sensor 27b, and also includes a signal connection 55b to the signal processor 57.

Figure 4:
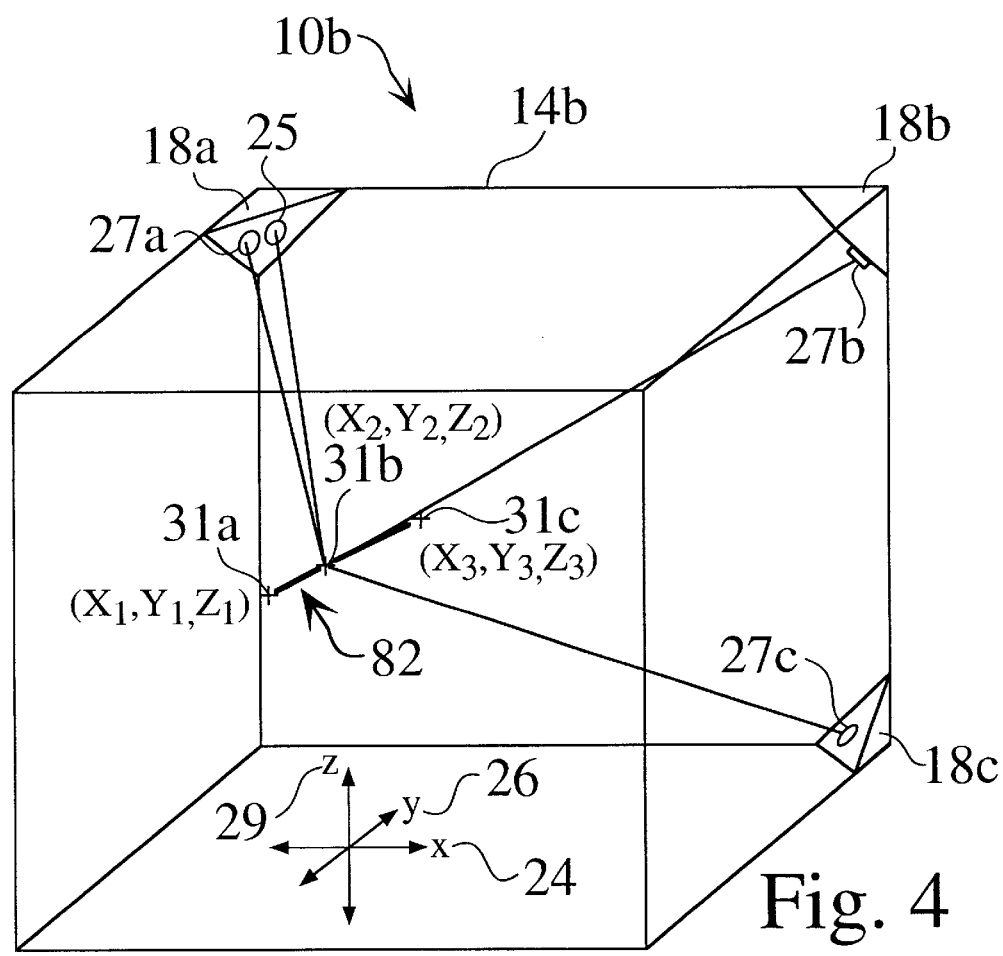
FIG. 4 is a perspective view of an alternate embodiment of the transmitter pen location system, in which a transmitter pen is located within a writing volume, and in which the transmitter pen periodically sends a combined output signal to external receivers.

FIG. 4 is a perspective view of an alternate embodiment of the transmitter pen location system 10b, in which a transmitter pen 30 is located within a writing volume 14b, and in which the transmitter pen 30 periodically sends a combined output signal 16 to external receivers 18a, 18b, and 18c. The geometric relationship between the transmitter pen 30 and the external receivers 18a, 18b and 18c is repeatedly determined, wherein the successive calculated (X,Y,Z) positions 31a, 31b, 31c of the transmitter pen 30 describe a path 82, in relation to an X-axis 24, a Y-axis 26, and a Z-axis 29.

The transmitter pen 30 has multiple transducer elements 28,44 (FIGS. 5–7), which are used to determine the location of the pointing tip of the transmitter pen 30, in relation to a writing area 14a, or to a writing volume 14b, of a transmitter pen location system 10. The first output element 44, preferably an electromagnetic or infrared transmitter 44, transmits a first output signal 60 from the transmitter pen 30 to first output signal sensors 25 (FIG. 3) at one or more of the external receivers 18. In one embodiment, the first output signal sensors 25 are infrared photodiodes, Part No. SFH 205FA, manufactured by Siemens Microelectronics, Inc., of Cupertino, Calif. The second output transducer 28 transmits a second output signal 58 from the transmitter pen 30 to second output signal sensors 27 at the external receivers 18. In one embodiment, the second output signal sensors 27 are ultrasound sensors, Part No. AT/R 40-10 P, manufactured by Nippon Ceramic Co. Ltd., of Tottori-Shi, Japan. In this embodiment, the second output transducer 28 on the transmitter pen 30 is an ultrasonic transmitter 28.

In an embodiment where each receiver 18 includes a first output sensor 25, the first output signal 60, which is repeatedly transmitted from the transmitter pen 30, typically in a periodic manner, arrives at each of the receivers 18 generally concurrently. Since the first output signal 60 arrives at one or more first output sensors 25 generally concurrently, only one first output sensor 25 is typically required, and is typically located at one of the external receivers 18, or at another external point near the periphery of the writing area 14.

A slower second output signal 58, which is also repeatedly transmitted from the transmitter pen 30, typically in a periodic manner, at a known time in relation to the first output signal 60, arrives at the external receivers 18 at a time which is dependent on the velocity of the second output signal 58. The transmission of the second output signal 58 can either be before, after, or concurrent with the transmission of the first output signal 60, as long as there is a known time between the transmission of the output signals 58, 60.

The velocity of propagation of the first output signals 60 and the second output signals 58 are required to be different, so that time span between the arrival of the first output signals 60 and the second output signals 58 at each of the external receivers 18 is dependent on the relative distance between the transmitter pen 30 and each of the external receivers 30.

In one embodiment, the first output signal 60 is an infrared signal 60, and the second output signal 58 is an ultrasound signal 58. In this embodiment, therefore, the propagation velocity of the second output signal 58 is lower than that of the first output signal 60.

When a combined signal 16, comprising a first output signal 60 and a second output signal 58, arrives at each of the receivers 18, the combined signal 16 is sampled, and is then transferred to a signal processor 57 (FIG. 11). The location of the pointing tip 36 (FIGS. 5–7) of the transmitter pen 30 is then determined by the signal processor 57, using the first signal 60 as a boundary condition, by solving for calculated distances to each of the receivers 18 using the second output signal 58, and then by determining a location of the pen based on the calculated distances to the receivers 18.

As shown in FIG. 2, the distance $d_1$ to the first external receiver 18a is determined by the relative time of reception of a second output signal 58 and a first output signal 60 within a combined signal pair 16. The distance $d_1$ defines a circular arc 23a of possible X,Y locations for the transmitter pen 30. The distance $d_2$ to the second external receiver 18b is determined by the relative time of reception of the second output signal 58 and the first output signal 60 within the same combined signal pair 16. The distance $d_2$ thus defines a second circular arc 23b of possible X,Y locations for the transmitter pen 30, in relation to the second receiver 18b. The $(X_1,Y_1)$ position of the transmitter pen 30 is shown, and is calculated, as the intersection 22 of possible X,Y locations given by the first arc 23a and the second arc 23b within the writing area 14.

Transmitter Pen Location Process. The transmitter pen location process, which uses the transmitted combined output signal 16 to locate the transmitter pen 30 relative to the writing area 14 of a surface 12, comprises the following steps:

i) sending a first output signal 60 having a first time of propagation from the transmitter pen 30 repeatedly to at least one of a plurality of external receivers 18;

ii) sending a second output signal 58, having a time of propagation different from the time of propagation of the first output signal 60, repeatedly from the transmitter pen 30 to the plurality of external receivers 18;

iii) comparing the second output signal 58b received at each receiver to a stored prior second output signal 58a received at each receiver 18 to determine the time of arrival of the second output signal 58 at each receiver;

iv) determining the distance from the transmitter pen 30 to each of the plurality of external receivers 18 based on the time of arrival of the first output signal 60 and the second output signal 58b; and v) determining the location of the transmitter pen 30 based upon. the determined distance from the transmitter pen 30 to each of the plurality of external receivers 18.

The transmitter pen location process then preferably stores 158 (FIG. 11) the received second output signals 58b received at each of the receivers 18, typically replacing the prior second output signals 58a, whereby the process is repeated for the next received combined output signal 16. In another preferred embodiment, precision is improved further, by storing more than one previous second output signal pulse 58, and by comparing the incoming second output signal 58b to a plurality of prior second output signals 58a.

Figure 5:
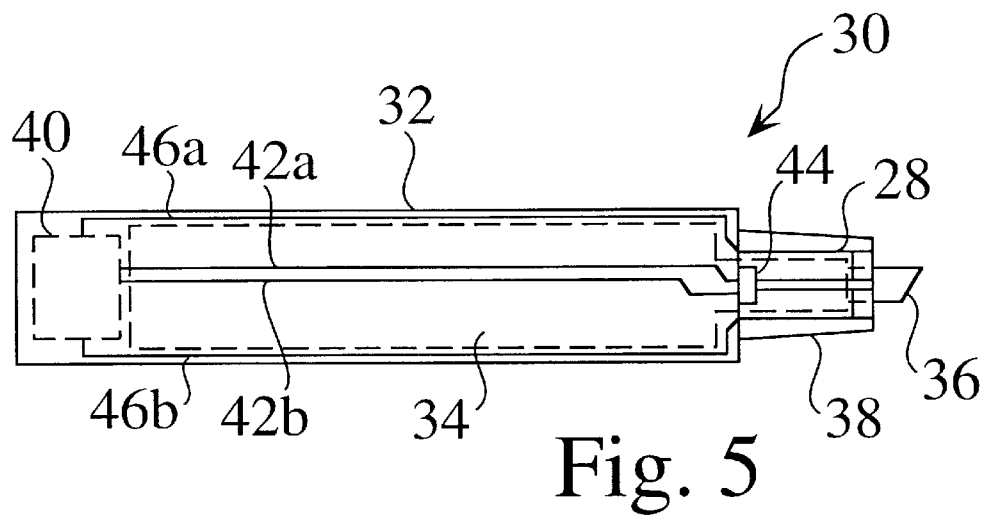
FIG. 5 is a partial cutaway view of a transmitter pen having a first output signal transducer and a second output signal transducer.

Transmitter Pen. FIG. 5 is a partial cutaway view of a transmitter pen 30 having a first output signal transducer 44 and a second output signal transducer 28. While the transmitter pen 30 is described as a pen, it can be any sort of movable transmitter device. The transmitter circuitry 40, connected to the first output signal transducer through leads 42a and 42b, excites the first output signal transducer 44, to produce a first output signal 60. The transmitter circuitry 40 is also connected to the second output signal transducer 28 through leads 46a and 46b, and excites the second output signal transducer 28, to produce a second output signal 58. In one embodiment, the second output signal 58 pulse train has a periodic frequency of 50 pulses per second.

Figure 6:
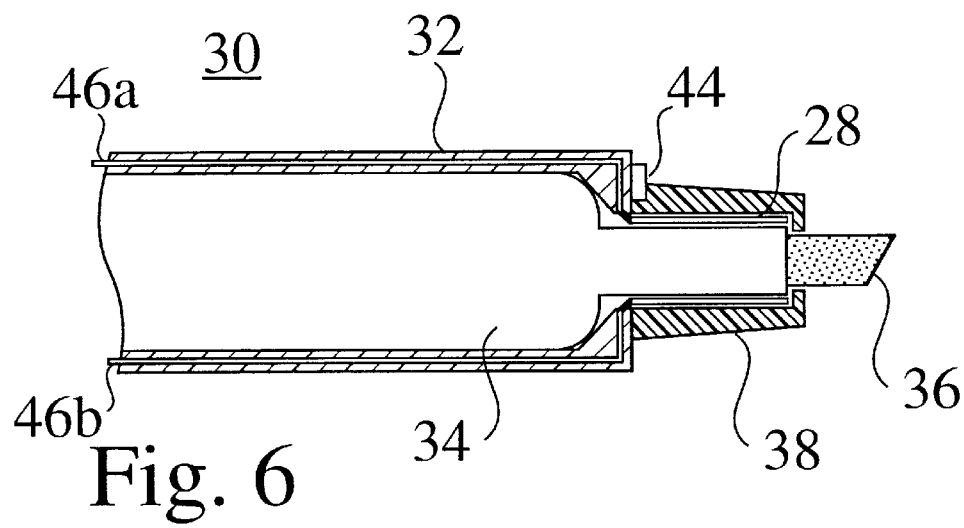
FIG. 6 is a detailed cutaway view of the pointing tip of a transmitter pen having a first output signal transducer and a second output signal transducer.
Figure 7:
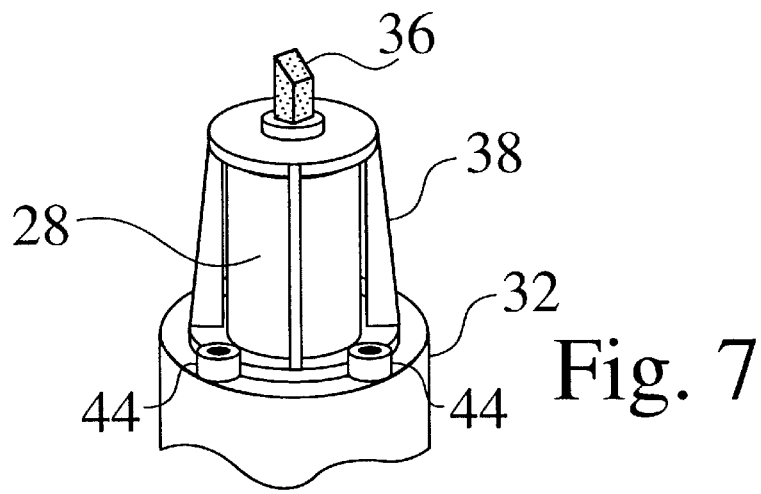
FIG. 7 is a partial perspective view of the pointing tip of a transmitter pen having a plurality of first output signal transducers and a single second output signal transducer.

FIG. 6 is a detailed cutaway view of the pointing tip 36 of a transmitter pen 30 having a first output signal transducer 44 and a second output signal transducer 28. FIG. 7 is a partial perspective view of the pointing tip 36 of a transmitter pen 30 having a plurality of first output signal transducers 44 and a single piezoelectric second output signal transducer 28. An optional finger guard 38 protects the first output signal transducers 44 and the second output signal transducer 28.

Figure 8:
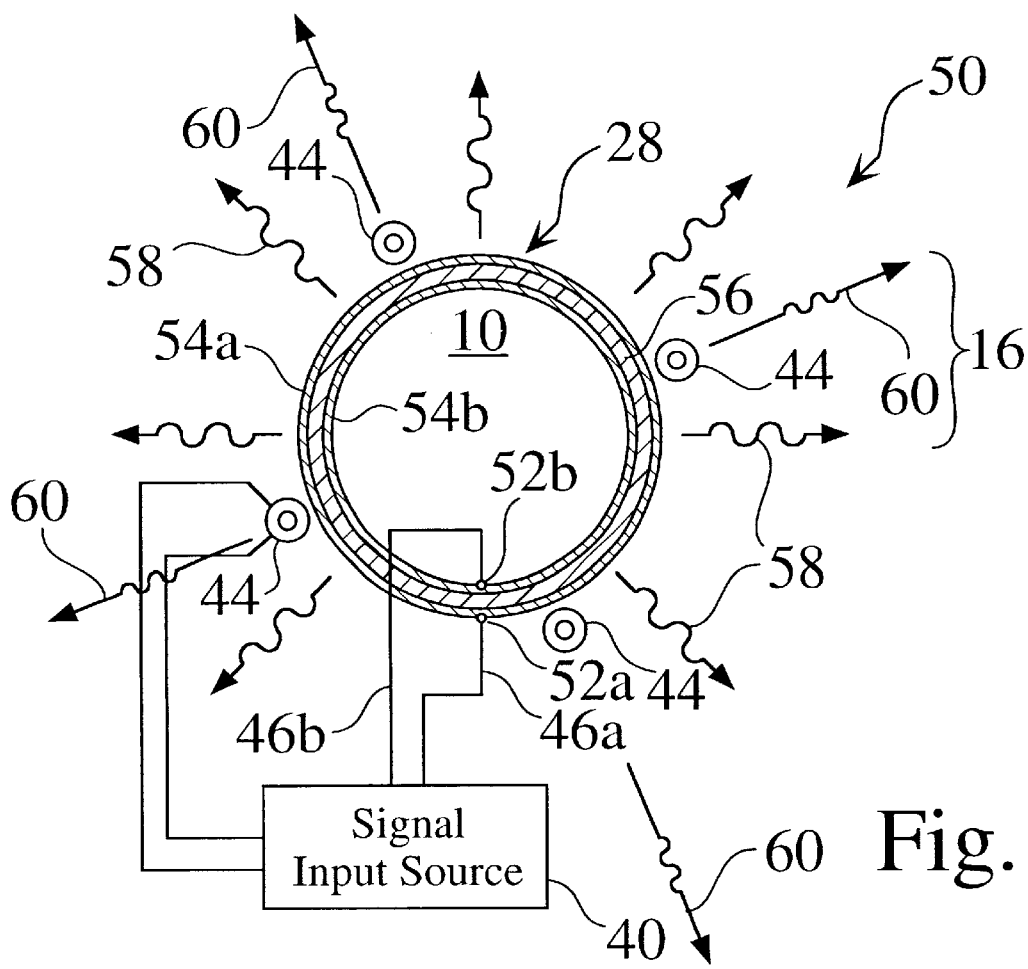
FIG. 8 is schematic view of the transmission of first output signal and a second output signal from a transmitter pen.

Output Signal Transmission. FIG. 8 is schematic view 50 of the transmission of the combined output signal 16, which is comprised of a first output signal 60 and a second output signal 58.

Figure 9:
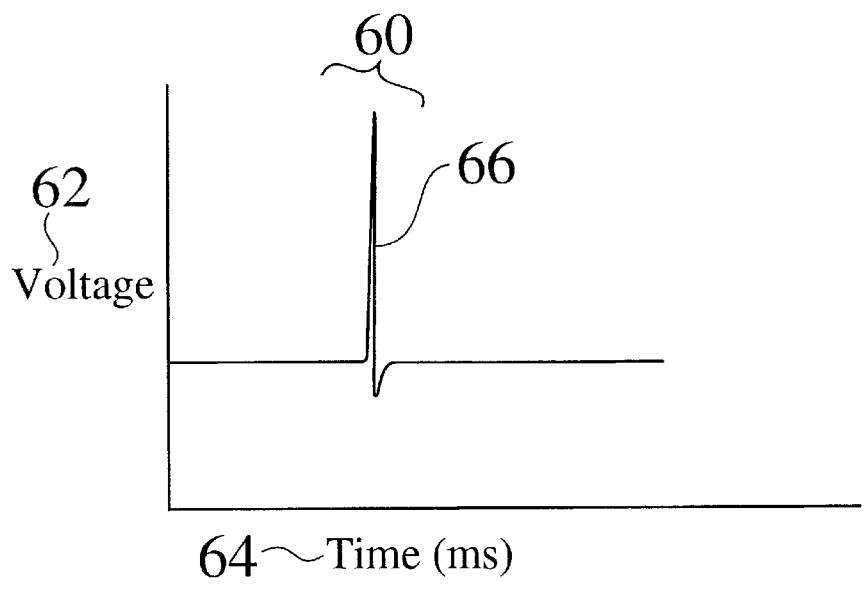
FIG. 9 shows a short pulse waveform of a typical first output signal sent from a transmitter pen.

The first output signal 60 is typically an infrared output signal 60, which is transmitted from one or more infrared transducers 44 located near the pointing tip 36 of the transmitter pen 30. FIG. 9 shows a single short pulse waveform 66 of a typical first output signal 60 sent from a transmitter pen 30. In one embodiment, the infrared transducers 44 are Part No. SFH426, manufactured by Siemens Microelectronics, Inc., of Cupertino, Calif. While only one infrared transducer 44 is required, the use of more than one infrared transducer 44 is preferred, since it allows better line-of-sight transmission of the first output signal 60 to each of the external receivers 18, such that the transmitter pen 30 can be rotated by the user.

The second output signal 58 is typically an ultrasound output signal 58, which is transmitted from one or more ultrasound transducers 28 located near the pointing tip 36 of the transmitter pen 30. In one embodiment, the ultrasound transducer 28 is a cylindrical layered piezoelectric layer 56 surrounded by an outer conductive layer 54a and an inner conductive layer 54b, which is connected to the transmitter circuitry 40 by leads 46a and 46b and lead connections 52a and 52b. In another embodiment, the ultrasound transducer 28 used is Part No. AT/R 40-10P, manufactured by Nippon Ceramic Co. Ltd., of Tottori-Shi, Japan.

Figure 10:
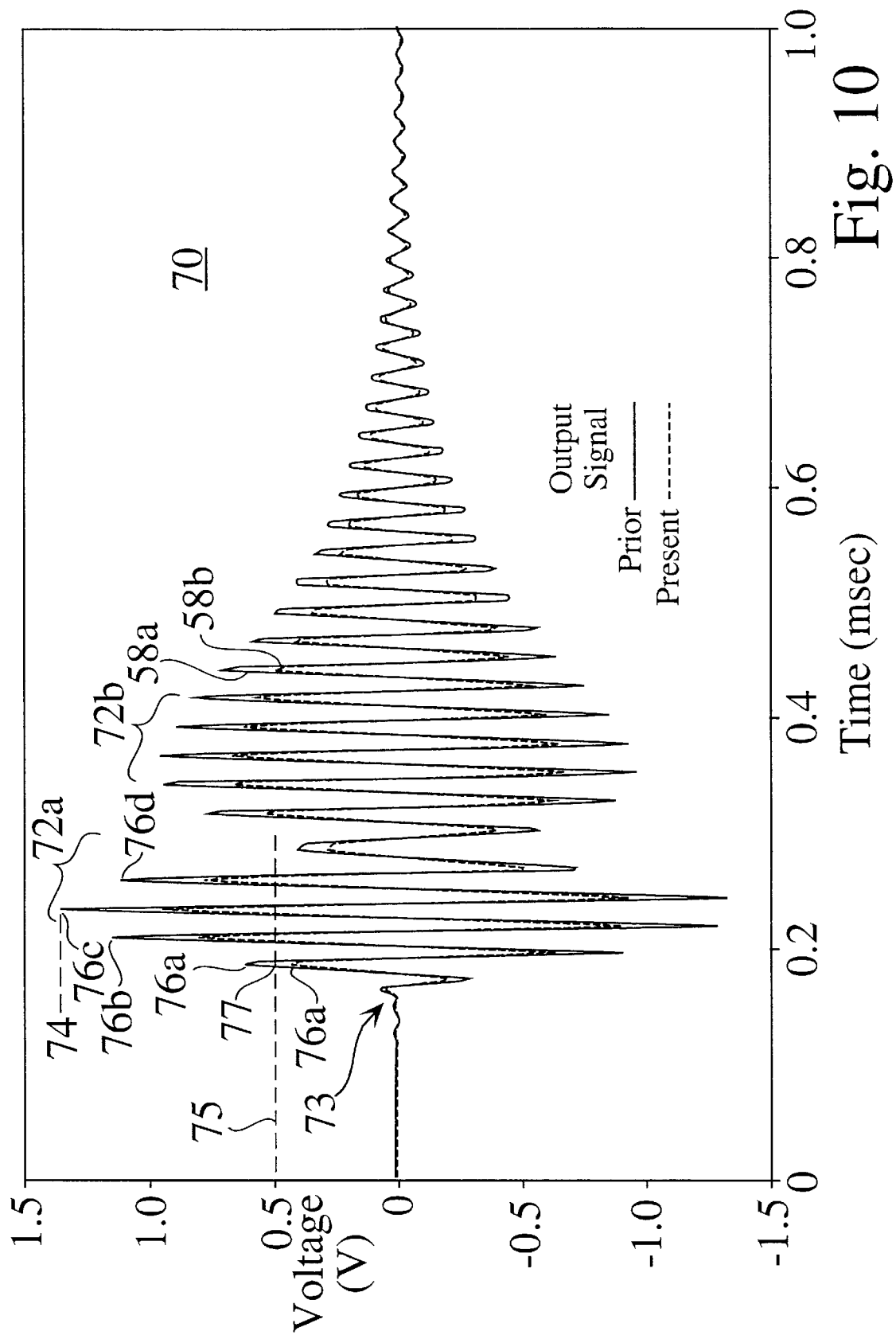
FIG. 10 shows a shaped pulse waveform of one embodiment of a second output signal sent from a transmitter pen.

FIG. 10 shows a first shaped pulse waveform 58a and a second, subsequent shaped pulse waveform 58b sent from a transmitter pen 30. While an ultrasound second output signal 58 can have any waveform shape, including a single ultrasound pulse 72, it is preferred that the waveform be shaped to have a short duration, with distinctive wave characteristics, which allows the waveform to be measured and compared accurately, to provide an accurate calculated position for the transmitter pen 30 on a frequent basis. In the preferred embodiment shown in FIG. 10, the subsequent second output signals 58a, 58b each include two major pulses 72a and 72b, with specific timing between them. The short duration output signals 58 allow the transmitter pen 30 to send sequential output signals more frequently. The use of the short duration ultrasound output signal 58 with distinctive waveform characteristics 72a,72b also allows the transmission of other information to be sent from the transmitter pen 30 to the external receivers 18, as discussed below. While there are differences between the received amplitude of the subsequent second output signals 58a and 58b, each of the signals retain major features, such as waveform characteristics 72a,72b, as well as wavelength dependent features, such as peaks 76a, 76b, 76c, and 76d. Comparison of these features between subsequent stored digitized output signals 58a and current output signals 58b allows the calculated transcribed path 82 of a transmitter pen 30 to be accurately determined, as discussed below.

FIG. 11 is a top view 80 of a calculated transcribed path 82 of a transmitter pen 30 from sequential locations within the writing area 14 of a surface 12. As the transmitter pen 30 is moved by a user across the writing area 14 of the surface 12, the repeated transmission of combined output signals 16 is received at the external receivers 18. The receivers 18 are connected 55 to a signal processor 57, which calculates successive X-Y locations 84a, 84b, . . . 84n, in relation to a defined X-axis 24 and a Y-axis 26. The successive X-Y locations 84a, 84b, . . . 84n define a path 82 for the transmitter pen 30. The successive X-Y locations 84a, 84b, . . . 84n, and the defined path 82 can then be stored or transferred by the signal processor 57.

In a preferred embodiment, a functional area 85 is defined in the whiteboard 12. Selective activation of the transmitter pen 30 within the functional area 85 is used to send function commands to the signal processor 57, or to a computer 87 connected to the signal processor 57. Function commands can be used to print the displayed image path 82, save the image path 82, create a new page, or to control functions on the connected computer 87, such as by activating pull-down menus on a graphic-user interface (GUI) 89 on the connected computer 87.

In another preferred embodiment, a programmable control application 91 within the computer 87 communicates with the signal processor 57, to control system options, such as waveform comparison algorithms, and the desired number of previous second output signals 58a to be stored 158 and compared to current second output signals 58b. Since the prior second output signals 58a are captured and stored in a digital manner, the comparison between prior second output signals 58a and current second output signals 58b can be efficiently monitored or modified through the programmable control application software 91.

FIG. 12 shows a combined output signal 16 as it is sent from a transmitter pen 30. The combined output signal 16 is comprised of a repeated transmission of a first output signal 60, and a repeated transmission of a second output signal 58. The repeated transmission of the first output signal 60 and the second output signal 58 are typically characterized by periods $P_1$ and $P_2$ respectively. While the period $P_1$ of the first output signal 60 and the period $P_2$ of the second output signal 58 are typically equal, the periods $P_1$ and $P_2$ do not have to be the same.

Figure 13:
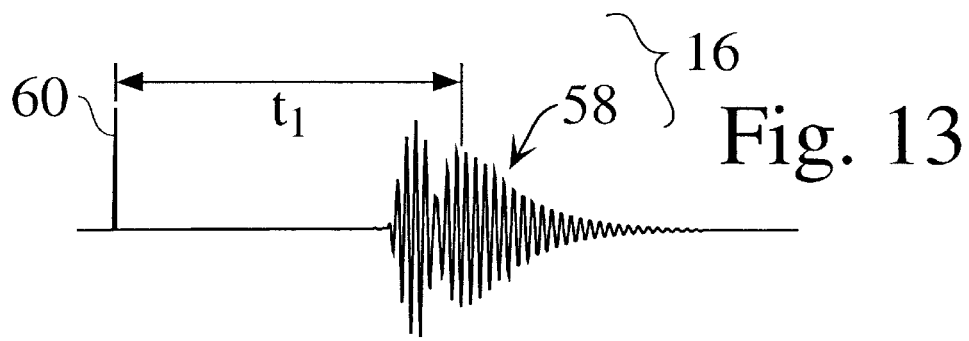
FIG. 13 shows a combined output signal as it arrives at a first external receiver.
Figure 14:
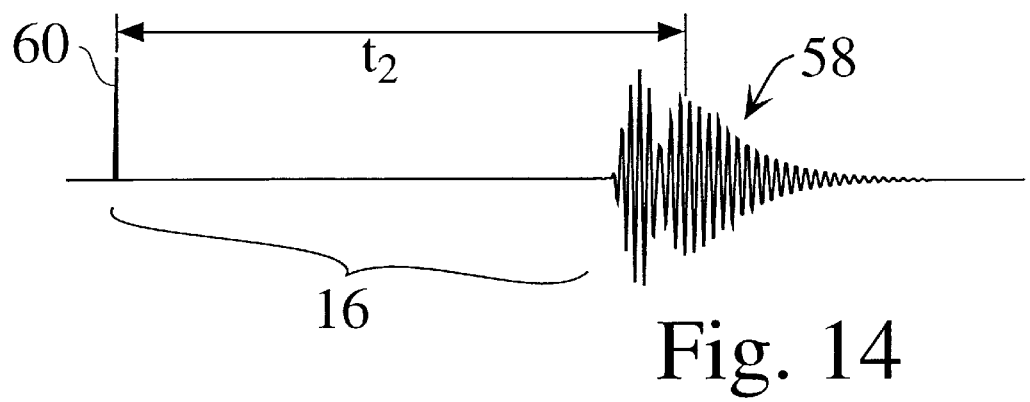
FIG. 14 shows a combined output signal as it arrives at a second external receiver.

Transmitter Pen Location Algorithm. In the embodiment shown in FIGS. 12–14, the infrared output signal 60 and the ultrasound output signal 58 are transmitted by the transmitter pen 30 at the same time. In this embodiment, therefore, the ultrasound output signal 58 arrives at each of the external receivers 18 later than the infrared output signal 60. FIG. 13 shows the combined output signal 16 as it arrives at a first external receiver 18a. FIG. 14 shows the same combined output signal 16 as it arrives at a second, further, external receiver 18b. The distance between the first output signal 60, typically comprising one or more infrared pulses 66, and the second output signal 58, typically an ultrasound waveform, acts to define the relative time to travel to different external receivers 18.

The accuracy of the location of the transmitter pen 30 is therefore dependent on the accuracy with which the signal processor 57 connected to the receivers 18 can consistently determine the distance in time between the first output signal 60 and a repeatable reference point 77 (FIG. 10) of the second output ultrasound signal waveform 58. Any repeatable reference point 77 on the second output ultrasound signal waveform 58 is sufficient to compare a second output ultrasound signal waveform 58 to stored second output ultrasound signal waveforms 58a, as long as the repeatable reference point 77 is consistently identified on the current second output ultrasound signal waveform 58b and on the stored prior second output ultrasound signal waveforms 58a.

In FIG. 10, the crossing time threshold 73 indicates a starting point for the repeated ultrasound output signals 58. In embodiments where an ultrasound second output signal 58 is used, it is preferred to use a linearly decaying ultrasound threshold 73, since the amplitude. of the ultrasound signal 58 falls off like 1/r with distance. At times $t_1, t_2, \ldots t_N$, where N equals the number of receivers 18 (where $N \geq 2$), as shown in FIG. 13 and FIG. 14, the ultrasound signal 58 is received at two or more external receivers 18.

The signal processor 57 finds a repeatable reference point 77 on the ultrasound output signal 58a, 58b, which in one embodiment lies between the threshold crossing 73 and the second peak 76b. In FIG. 10, a threshold value 75 of 0.5 volts is used to determine points along the subsequent output signals 58a, 58b. As seen in FIG. 10, the first point along the first output signal 58a to cross the threshold value is located along the first peak 76a. In contrast, the first point along the second output signal 58b to cross the threshold value 75 is located along the second peak 76b. Since subsequent output signals 58a, 58b typically have different amplitudes, arbitrary measurement of a threshold 75 to determine a reference point 77 can yield differences between subsequent signal 58 on the order of a wavelength.

To provide a more accurate repeatable reference point 77 on the present ultrasound output signal 58b that lies between the threshold crossing 73 and the second peak 76b, the signal processor 57 stores a prior output signal 58a, and compares repeatable features between the present second output signal 58b and the stored prior second output signal 58a. Repeatable features that are distinguishable typically include the shape of major peaks 72a, 72b and minor peaks 76a, 76b, interpeak spacing, and the relative amplitude of the major peaks 72a, 72b and minor peaks 76a, 76b.

Since the prior output signal 58a is stored, any or all features can be analyzed and compared, to determine an accurate repeatable reference point 77. Even the combined relationship between sets of features can be compared. In a preferred embodiment, the current output signal 58b and one or more stored prior output signals 58a are energy-normalized, such that individual peaks 72, 76 are fit to each other between the current output signal 58b and the stored prior output signals 58a. The normalized output signals are then compared for features that do not depend on the amplitude of separate points on the signals 58a, 58b, but on the relationship between features.

In the example shown in FIG. 10, the signal processor 57 adjusts the actual threshold crossing on peak 76b on the present output signal 58b by the period of one wavelength, to establish an adjusted threshold crossing 77 that is consistent with the features of the stored signal 58a. In this manner, the signal processor 57 typically uses the previously received and stored pulse 58a, from the same receiver 18, to determine the repeatable reference point 77 on the current ultrasound signal 58.

This comparison is also performed for the present output signal 58b and the prior output signal 58a for each of the receivers 18. As the arriving second output signal 58 is attenuated differently as it is transmitted and sent to different receivers 18, the output signal 58a is preferably stored 158 for each receiver location 18, to provide an accurate comparison for subsequent output signals 58 arriving at each receiver location 18.

The current ultrasound signal 58b for each receiver 18, together with the detected start of the signal reference points 73 and repeatable points 77, are then stored within memory 158 for analysis of subsequent output signals 58. For each receiver 18, a plurality of prior signals 58a, with reference points 73,77, can be used to determine repeatable features 77 of the current second output signal 58a. However, a limited number of previous ultrasound signals 58a from each receiver 18 are typically stored, to conserve memory space within memory 158.

This is repeated for all N receivers 18, giving $N \geq 2$ estimates of the time of propagation of the second output ultrasound signal 58b. The $N \geq 2$ second output signals 58b, along with associated reference points 73,77, are then stored within memory 158 as prior second output signals 58a, for the analysis of subsequent second output signals 58b.

The comparison of the currently received output signal 58b to previously received and stored output signals 58a results in consistent time values, which yield consistent pen location values 84a, 84b, . . . 84n that define a smooth path 82 (FIG. 11).

After the time of arrival values $t_1$, $t_2$ are calculated for each combined signal 16, the signal processor 57 calculates the X and Y position from the time of arrival values $t_1$ and $t_2$, using standard trigonometric calculations, such as:

$$X = \frac{(t_1 \cdot t_1) + (D \cdot D) - (t_2 \cdot t_2)}{2D} \quad (1)$$

$$y = sqrt(t_1 \cdot t_1 - x \cdot x) \quad (2)$$

in which D (FIG. 1) is the distance between receivers 18, in units of time taken for the ultrasound signal 58 to travel from one receiver 18 to another receiver 18.

System Advantages. Prior analog systems are inherently limited to "on the fly" comparison between a current signal burst and a small amount of amplitude information from a single prior signal. Since analog systems do not store the entire prior signal bursts in memory, they are limited to the comparison of a small number of features on the last prior signal.

In contrast, the transmitter pen location system 10 advantageously stores one or more prior signals 58a, allowing the comparison of a large number of features between the current second output signal 58b and one or more prior second output signals 58a.

Figure 15:
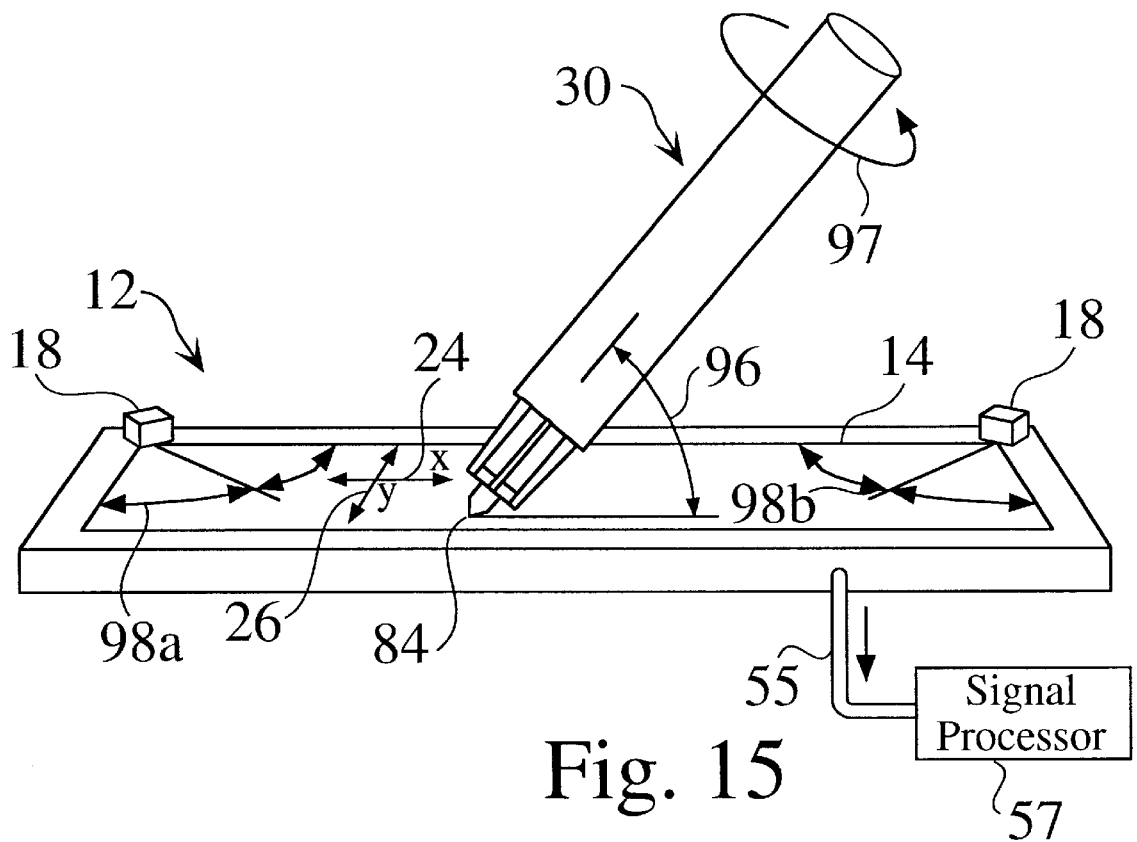
FIG. 15 is a perspective view showing changes in transmitter pen orientation which can alter the received waveform of the second output signal as it arrives at an external receiver.
Figure 16:
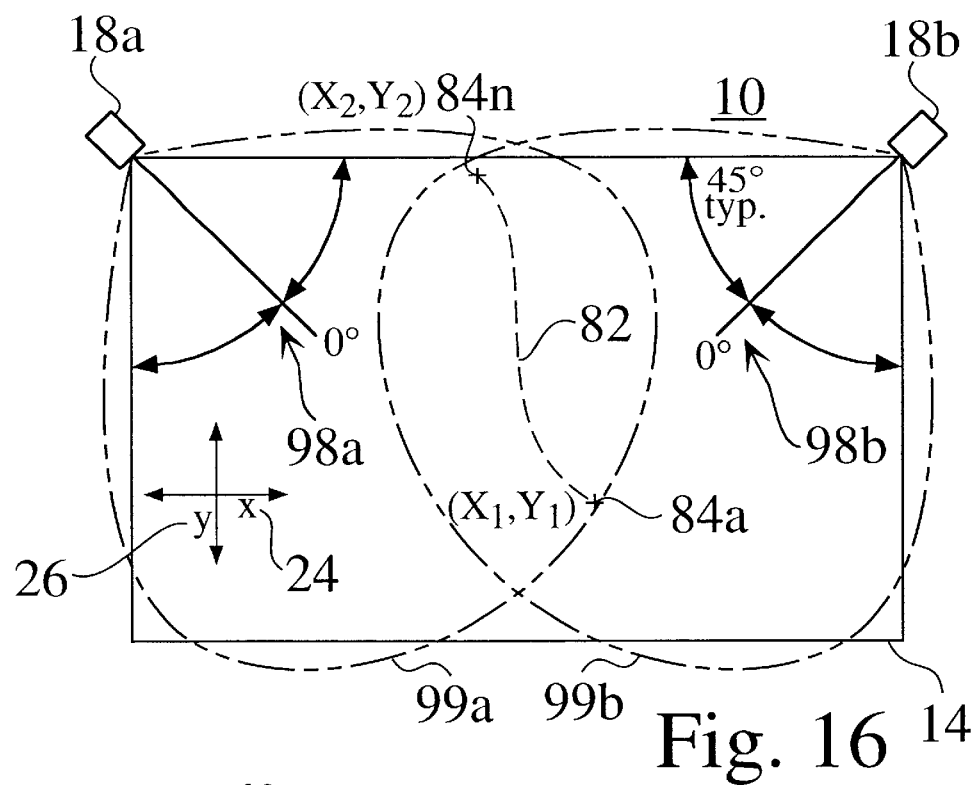
FIG. 16 a top view showing the directional reception characteristics of one embodiment of second output sensors at external receivers.

As well, the transmitter pen location system 10 can accurately determine the location of the transmitter pen 30, even when the second output signal 58 is significantly attenuated. FIG. 15 is a perspective view showing changes in transmitter pen orientation in relation to external receivers 18a, 18b, which can significantly alter the received waveform of the second output signal 58 as it arrives at external receivers 18. As discussed above, the amplitude of the incoming waveform 58 can change significantly. from the distance to each of the receivers 18a, 18b. Other factors also contribute to the attenuation of the second output signal 58, including the angular orientation 98a, 98b between the transmitter pen 30 and the external receivers 18, the angle 96 of the inclined movable transmitter pen 30 against the surface of the writing area 14, the axial rotation 97 of the pen, and even the available source power to the output circuitry 40 within the transmitter pen 30. FIG. 16 a top view showing the directional reception characteristics 99a, 99b of one embodiment of second output sensors 27a, 27b at external receivers 18a, 18b. The receivers 18a, 18b are typically placed at an angle of approximately 45 degrees in relation to a rectangular writing area 14, to improve signal detection of the second output signal 58.

Since the current second output signal 58b and one or more stored prior output signals 58a are typically normalized to each other, and since detailed features between the current second output signal 58b and one or more stored prior output signals 58a can be used for comparison, attenuation of the incoming signals 58a, 58b does not prevent the transmitter pen location system 10 from accurately finding a repeatable reference point 77 between output signals 58a, 58b.

In contrast, prior art analog systems that rely on the comparison of a limited number of measured amplitudes of a limited number of points, such as the measured amplitudes of bursts or peaks, or an average of a limited number of peaks, will commonly fail to find a valid data point for the transmitter pen, particularly when consecutive output pulses are attenuated differently. This results either in erroneous positions (e.g. typically by missing a desired signal peak), or in requiring that position points are not used in the described path of a movable pointer, resulting in an inaccurate or erratic described path.

In the present digital transmitter pen location system 10, the storage of the received signal 58 to memory allows signal processing comparison techniques between the current second output signal 58b and the stored waveform 58a to be performed, such as by cross-correlation methods. An accurate comparison between the features of the present 58b and prior second output signals 58a can therefore be made. As the second output signals 58b arrive at the signal processor 57, they are preferably normalized to prior stored signals 58a. When the received second output signals 58b and one or more stored second output signals 58a are normalized to each other, a valid comparison an be made between the normalized output signals 58a, 58b. When the received second output signals 58b and one or more stored second output signals 58a have widely varying signal strengths, it is still possible to cross-correlate features between the normalized paths, rather than to compare the amplitude of a limited number of data points.

In addition, preferred embodiments of the transmitter pen location system 10 allow changes to the comparison of features between the current second output signal 58b and one or more stored prior second output signals 58a. The programmable control application 91 (FIG. 11) is typically controllable and updatable, allowing the signal processor 57 to be updated, and to be easily adapted to different transmitter pens 30, different surfaces 12, and different receivers 18.

Communication of Supplementary Information. The output signal characteristics of the circuitry 40 and characteristic transmitter output signals 58, 60 can optionally communicate secondary information to the external receivers 18. Such supplementary information can include pen activation status, or pen types, such as different colored pens, or for pens of different widths, or even for calculated line types, such as for dashed lines. In systems where more than one user is writing on the writing area 14 of the surface 12, either sequentially of concurrently, the transmitter pens 30 can optionally communicate the designated user of each transmitter pen 30.

Figure 17:
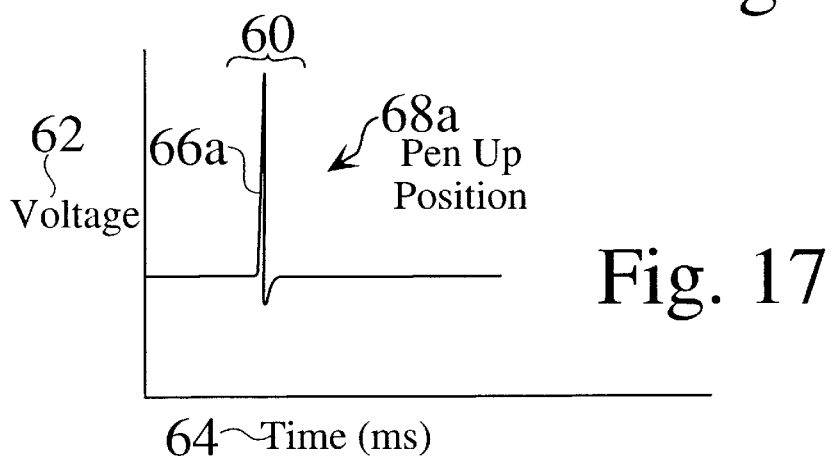
FIG. 17 shows a first output signal that includes encoded information which indicates a pen up position.
Figure 18:
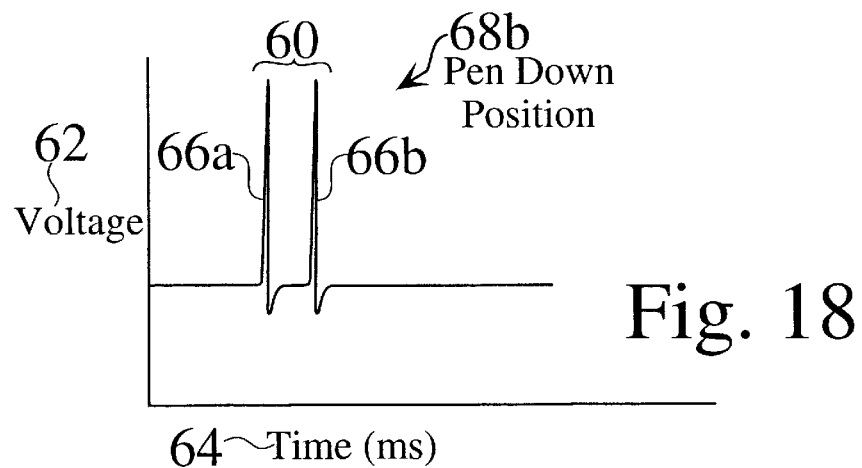
FIG. 18 shows a first output signal that includes encoded information which indicates a pen down position.

Pen Activation. FIG. 17 shows a typical first output signal 60 for a transmitter pen 30 in a "pen up" position 68a. The first output signal 60 is modified to designate whether the pen is inactivated in a first "pen up" position 68a, or in an activated second "pen down" position 68b. In FIG. 17, the output signal 60 includes a single infrared pulse 66a to designate a "pen up" position 68a. In the same embodiment, the first output signal 60 includes two closely space infrared pulses 66a and 66b to designate a "pen down" position 68b, as shown in FIG. 18.

When the "pen up" signal 68a is received by the receiver 18, the signal processor determines that the transmitter pen 30 is currently in its "pen up" position 68a. The "pen up" position 68a typically means that the pointing tip 36 of the transmitter pen 30 is not in contact with either the writing area 14 of the surface 12, or with another writing surface placed within the writing area 14, such as a piece of paper. The signal processor 57 is also able to determine the X-Y coordinate of the transmitter pen 30 while the transmitter pen 30 is in the pen-up position 68a.

When the "pen down" signal 68b is received by the receiver 18, the signal processor 57 determines that the pen 30 is currently in its "pen down" position 68b, and the X-Y coordinate of the pen 30 is also determined. The "pen down" position 68b typically means that the pen tip 36 is in contact with either the writing area 14 of the surface 12, or with another writing surface placed within the writing area 14, such as a piece of paper.

As the pen 30 is moved along a path 82 in the pen-down position 68b, a series of combined output signals 16 are received and processed by the receivers 18, from which successive X-Y coordinates are determined to produce a representation of the path 82 of the transmitter pen 30.

Calculated Pen Attributes. Transmitter pens 30 can optionally include circuitry 40 for a given pen "type", or can include switching or continuous adjustment control to produce a transmitter signal 58, 60 for different pen attributes. For example, a transmitter pen 30 which contains a single writing tip 36 having one color of ink, such as black ink, may be selectively adjusted by the user to produce output signals 58,60 that correspond to drawn paths 82 of varying colors, widths, or line styles. While the user draws or writes upon a writing surface 14 of a surface 12, such as a white board 12, displaying a black path 82 (FIG. 4,11), such as figures or letters, the transmitted and processed signal for the path 82 is dependent upon the pen characteristics chosen by the user.

Figure 19:
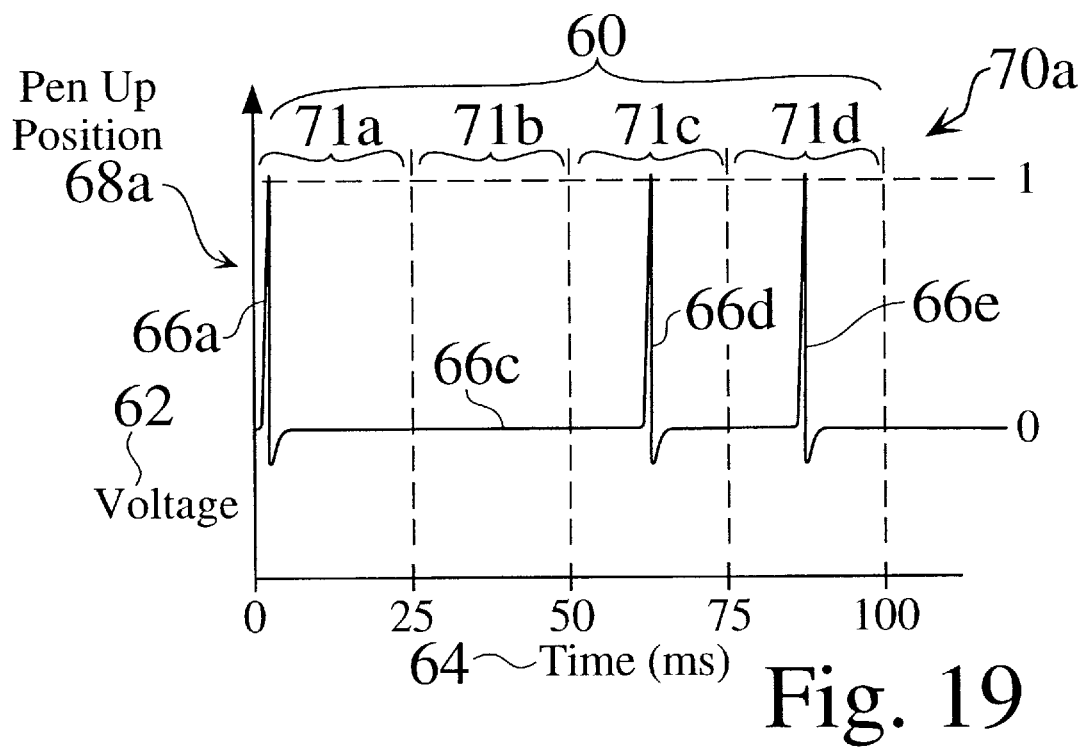
FIG. 19 shows a first output signal that includes encoded information which indicates a pen up position and supplementary information.
Figure 20:
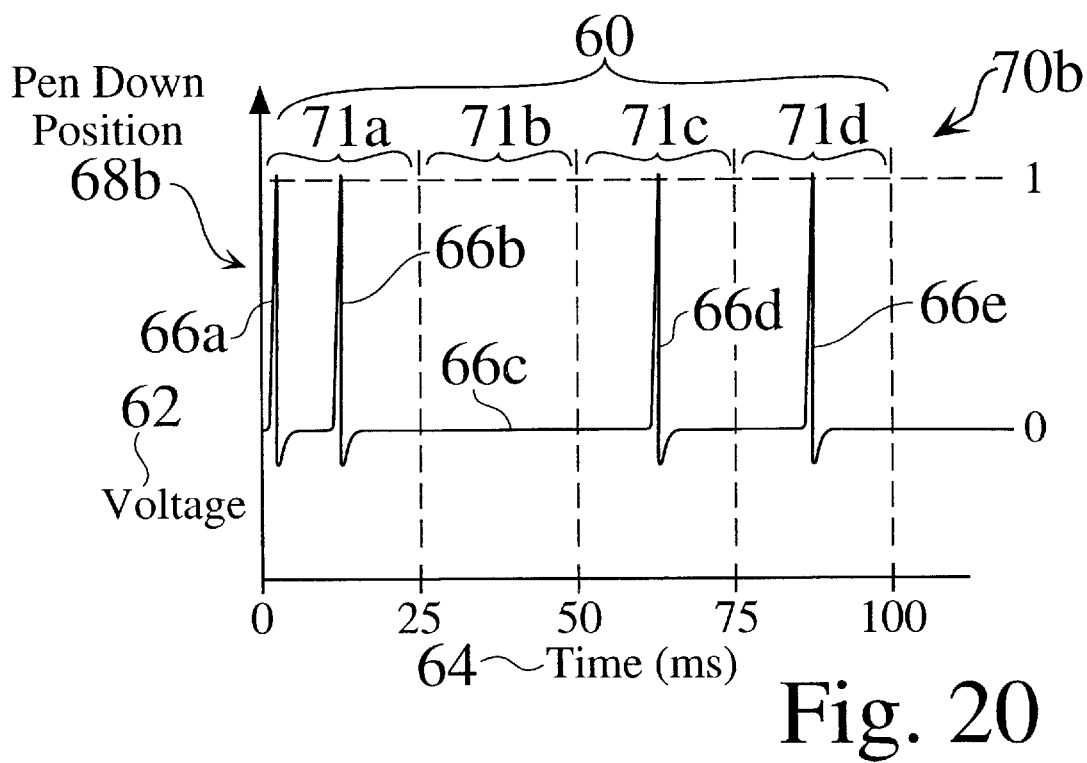
FIG. 20 shows a first output signal that includes encoded information which indicates a pen down position and supplementary information.

As shown in FIG. 19 and FIG. 20, the first input signal 60 can optionally provide supplementary information to the receivers 18. FIG. 19 shows a first output signal 60 that indicates a pen up position 68a, using a single pulse 66a, and encoded supplementary information 66c–66e. FIG. 20 shows a first output signal that indicates a pen down position 68b, using a two pulses 66a,66b, and encoded supplementary information 66c–66e. The supplementary information 66c–66e provides bit information, which defines pen characteristics, such as designated color, width, line type, or user identification (e.g. author).

Figure 23:
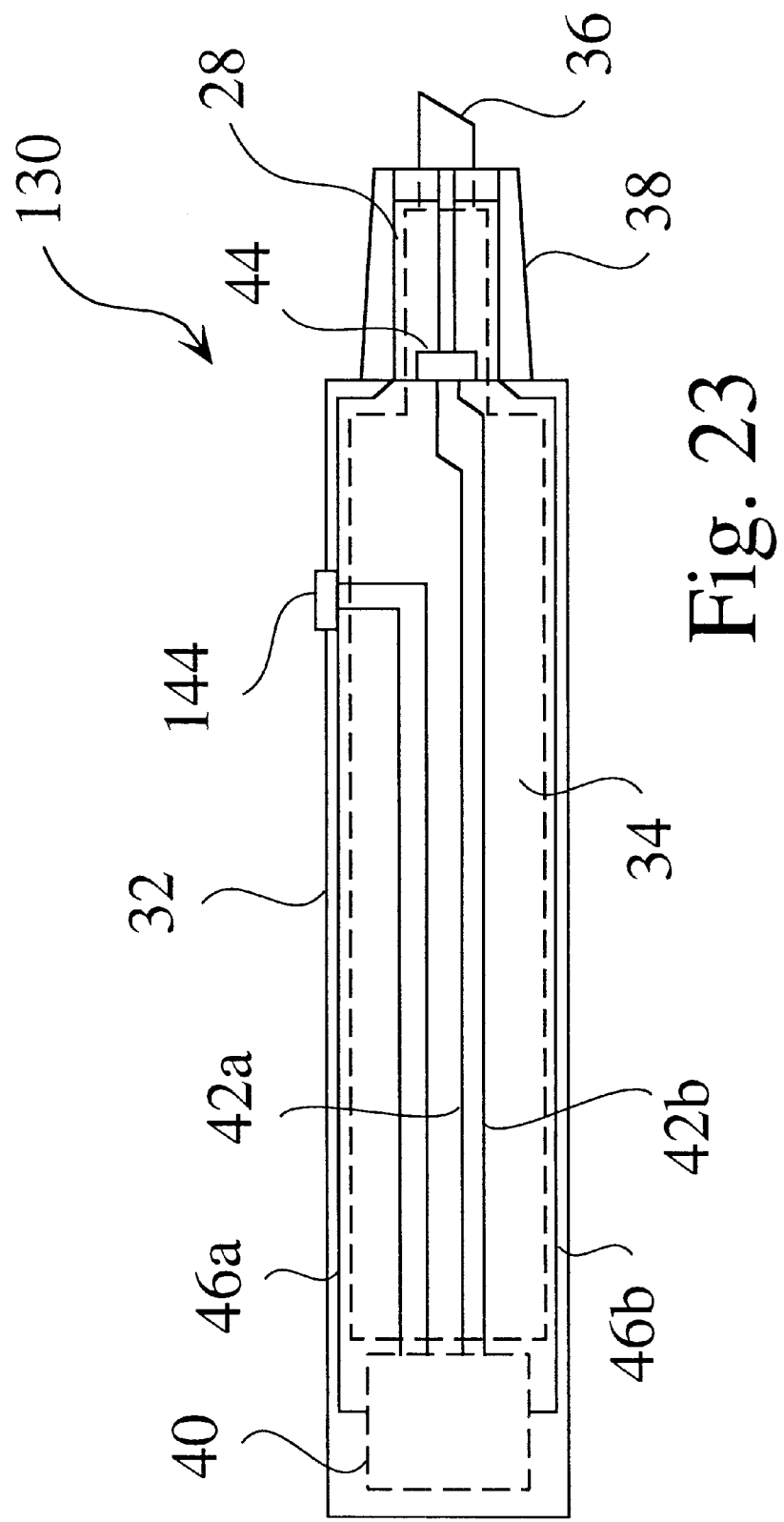
FIG. 23 shows a transmitter pen having a selective function button.

FIG. 23 shows a selective attribute transmitter pen 130 which includes a pen attribute switch 144. The attribute switch is connected to the signal circuitry 40 within the transmitter pen 130, and controllably alters the transmission of the encoded supplementary information 66c–66e within combined output signals 16. The characteristics or attributes of the transmitter pen 30 are thereby selectively activated by the user, through one or more buttons or switches 144, which control or define the encoded supplementary information 66c–66e.

The determined color for a transmitter pen 30 can either be encoded in the first output signal 60, such as within multiple infrared pulses 66a–66e, or within the second output signal 58, such as within distinct waveshapes 72a, 72b (FIG. 10).

There are various ways to include the pen color within the first output signal 60. In the pulsed infrared signal 60 shown in FIG. 15, the time between the pen activation pulses 66a,66b and the secondary information pulses 66c–66e can span a time that is specific to a particular pen color. For example, a first pulse delay between the pen activation pulses 66a,66b and the secondary information pulses 66c–66e can specify a pen color of black, while a different pulse delay between the pen activation pulses 66a,66b and the secondary information pulses 66c–66e can specify a pen color of blue.

In the embodiment shown in FIG. 19 and FIG. 20, a time line 64 is broken up into discreet windows 71a–71d, wherein the presence or absence of an infrared pulse 66c–66e indicates a binary "0" or "1", which can be combined with pulses within other windows 71a–71d along the time line 64, to specify a pen color or type. In this manner, the presence of an infrared signal pulse 66 within a window 71 is identified as a bit within a number.

For example, in a three-bit number, three windows 71b–71d of 25–50 ms, 50–75 ms, and 75–100 ms are used to specify pen color. In this embodiment, the first window 71a of 0–25 ms is used to start the first output signal 60, in relation to the second ultrasound signal 58 within a combined signal pair 16.

In this embodiment, the three-bit number is chosen to represent pen color or type. Binary signals specify this supplementary information (e.g. 1=black; 2=red; 3=green; 4=blue). In the example shown in FIG. 19, the binary number for the 25–50 ms window 71b is a "0"; the binary number for the 50–75 ms window 71c is a "1"; and the binary number for the 75–100 ms window 71d is a "1". This yields a binary number of "011", or a "3", which specifies a pen color of green for a transmitter pen in an "up" position 68a. The same "green" transmitter pen 30 is shown in the down position 68b in FIG. 20.

Self Calibration. The distance D between receivers 18 can either be set once, such as for receivers 18 that are mounted a fixed distance from each other, or can be periodically set, such as for receivers 18 that can be remounted at different positions. The distance D between fixed receivers 18 can be stored within the signal processor 57.

Figure 21:
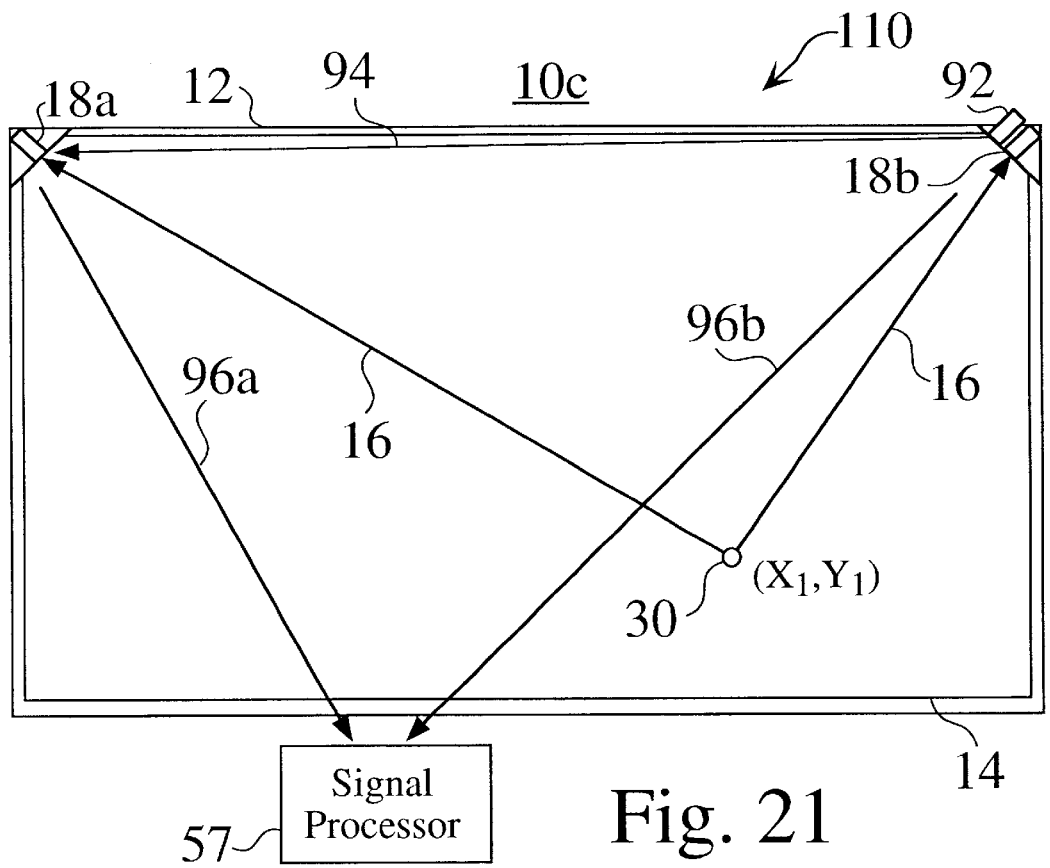
FIG. 21 is an alternate embodiment of the transmitter pen location system, having movable receivers, an automatic-calibration transmitter, and wireless communication between the receivers and the signal processor.
Figure 22:
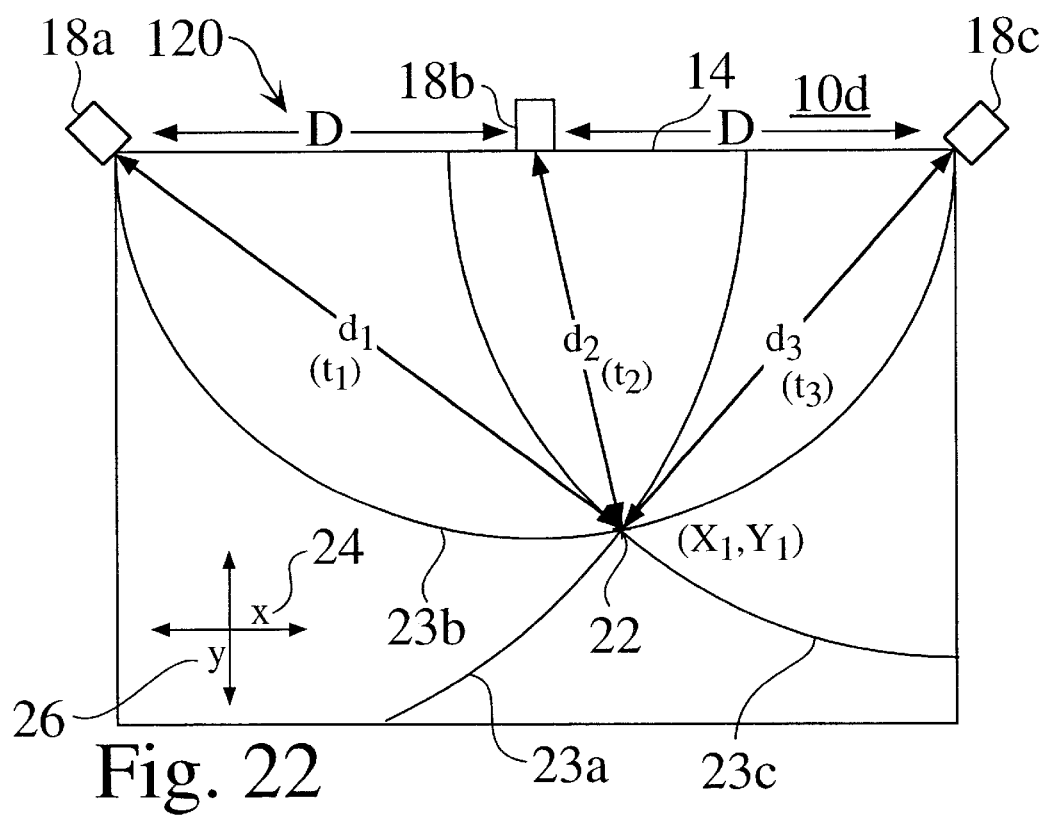
FIG. 22 shows the geometric relationship between a transmitter pen and three external receivers, with the calculated position of the pen shown as the intersection of three arc lengths.

FIG. 21 is an alternate embodiment 90 of the transmitter pen location system 10c, in which the receivers 18a,18b are movable, wherein a calibration transmitter 92 is added at one receiver location 18b, providing automatic self-calibration for the system 10b. An auto-calibration transmission signal 94 is sent from the receiver location 18b, and is received at another receiver location 18a. The signal processor 57 analyzes the incoming auto-calibration transmission signal 94, and determines the distance D between the receivers 18a,18b. A wireless connection is provided between the receivers 18a,18b and the signal processor 57, wherein information data signals 96a,96b are transmitted from the receivers 18a,18b to the signal processor 57. FIG. 22 is an alternate embodiment 110 of the transmitter pen location system 10d, which shows the geometric relationship between a transmitter pen 30 and three external receivers 18a,18b,18c. The calculated position of the pen 30 shown as the intersection of three arc lengths 23a, 23b and 23c. Small variations in distance D between receivers 18 can also be calibrated by the signal processor 57. This can be useful for many conditions, such as the variation of the speed of sound in different ambient environments (e.g. temperature, barometric pressure, relative humidity). From three time estimates ($t_1$, $t_2$ & $t_3$) the signal processor 57 calculates the distance between receivers 18 (dcalc) as:

$$dcalc = \sqrt{\frac{t_3^2 - 2t_2^2 + t_1^2}{2}}. \quad (3)$$

If the calculated dcalc is significantly different from the known distance D between receivers 18, the signal processor 57 determines that there is a problem with one or more of the time estimates $t_i$. The signal processor 57 can also average the known distance D with the calculated distance D between receivers 18, to adaptively change the value of D.

Although the transmitter pen location system and its methods of use are described herein in connection with computer input systems, the techniques can be implemented for other control or display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A transmitter location system between a movable transmitter and a plurality of receivers, comprising:
    a first output signal having a first speed of propagation, said first output signal being transmitted repeatedly from said movable transmitter to at least one of said plurality of receivers;
    a second output signal having a second speed of propagation different from said first speed of propagation of said first output signal, said second output signal being transmitted repeatedly from said movable transmitter to each of said plurality of receivers, wherein time to reach each of said plurality of receivers is dependent on a distance between said movable transmitter and each of said plurality of receivers; and
    means for determining location of said movable transmitter, using said first output signal, said second output signal, and a stored prior transmitted said second output signal to calculate distance from said movable transmitter to each of said plurality of receivers.

2. The transmitter location system of claim 1, wherein said stored prior transmitted said second output signal is a digitized prior transmitted said second output signal.

3. The transmitter location system of claim 1, wherein said means for determining location of said movable transmitter uses a plurality of said stored prior transmitted said second output signals to calculate distance from said movable transmitter to each of said plurality of receivers.

4. The transmitter location system of claim 1, wherein said means for determining location of said movable transmitter is programmable.

5. The transmitter location system of claim 1, wherein said second output signal and said stored prior transmitted said second output signal include a repeatable feature, and wherein said means for determining location of said movable transmitter compares said repeatable feature of said second output signal and said stored prior transmitted said second output signal.

6. The transmitter location system of claim 1, wherein said means for determining location of said movable transmitter normalizes said second output signal and said stored prior transmitted said second output signal.

7. The transmitter location system of claim 1, wherein said first output signal is an electromagnetic output signal.

8. The transmitter location system of claim 1, wherein said first output signal is an infrared output signal.

9. The transmitter location system of claim 1, wherein said first output signal has a first signal state and a second signal state.

10. The transmitter location system of claim 9, wherein said movable transmitter is located in a transmitter pen, wherein said first signal state corresponds to a pen up position of said transmitter pen, and wherein said second signal state corresponds to a pen down position of said transmitter pen.

11. The transmitter location system of claim 1, wherein said first output signal contains encoded information regarding said movable transmitter.

12. The transmitter location system of claim 11, wherein said encoded information includes a determined color of said movable transmitter.

13. The transmitter location system of claim 11, wherein said encoded information includes a determined line width of said movable transmitter.

14. The transmitter location system of claim 11, wherein said encoded information includes a determined line style of said movable transmitter.

15. The transmitter location system of claim 11, wherein said encoded information includes a user identification of said movable transmitter.

16. The transmitter location system of claim 1, wherein said second output signal is an ultrasound transmission signal.

17. The transmitter location system of claim 1, further comprising:
  a wireless connection between said plurality of receivers and said means for determining location of said movable transmitter.

18. The transmitter location system of claim 1, further comprising:
  a defined functional area, whereby movable transmitter is selectively activated to send functions to a computer.

19. The transmitter location system of claim 1, wherein said second output signal contains encoded information regarding said movable transmitter.

20. The transmitter location system of claim 19, wherein said encoded information includes a determined color of said movable transmitter.

21. The transmitter location system of claim 19, wherein said encoded information includes a determined line width of said movable transmitter.

22. The transmitter location system of claim 19, wherein said encoded information includes a determined line style of said movable transmitter.

23. The transmitter location system of claim 19, wherein said encoded information includes a user identification of said movable transmitter.

24. A location system, comprising:
  a surface having a writing area, plurality of receivers, and a signal processor;
  a movable device adapted to be located within said writing area of said surface, said movable device adapted to send a first output signal having a first speed of propagation repeatedly from said movable device to at least one of said plurality of receivers, said movable device also adapted
  to send a second output signal, having a second speed of propagation different from said first speed of propagation of said first output signal, repeatedly from said movable device to each of said plurality of receivers; and
  a signal processor connected to each of said plurality of receivers, which processes said first output signal, said second output signal, and a stored digitized prior transmitted said second output signal to calculate distance of said movable device to each of said receivers, and determines said location of said movable device, based upon said calculated distance from said portable transmitter to each of said plurality of receivers.

25. The location system of claim 24, wherein said signal processor compares waveform features between said second output signal and said stored digitized prior said transmitted second output signal.

26. The location system of claim 24, wherein said signal processor compares waveform features between said second output signal and a plurality of said stored digitized prior said transmitted second output signals.

27. The location system of claim 24, wherein said signal processor normalizes said second output signal and said stored digitized prior said transmitted second output signal.

28. The location system of claim 24, wherein said signal processor is programmable.

29. The transmitter location system of claim 24, wherein said surface is a white board.

30. The transmitter location system of claim 24, wherein said first output signal is an electromagnetic output signal.

31. The transmitter location system of claim 24, wherein said first output signal is an infrared output signal.

32. The location system of claim 24, wherein said first output signal has a first signal state and a second signal state.

33. The location system of claim 32, wherein said movable device is located in a transmitter pen, wherein said first signal state corresponds to a pen up position of said transmitter pen, and wherein said second signal state corresponds to a pen down position of said transmitter pen.

34. The location system of claim 24, wherein said first output signal contains encoded information regarding said movable device.

35. The location system of claim 34, wherein said encoded information includes a determined color of said movable device.

36. The location system of claim 34, wherein said encoded information includes a determined line width of said movable device.

37. The location system of claim 34, wherein said encoded information includes a determined line style of said movable device.

38. The location system of claim 34, wherein said encoded information includes a user identification of said movable device.

39. The location system of claim 24, wherein said second output signal is an ultrasound transmission signal.

40. The transmitter location system of claim 24, further comprising:
  a wireless connection between said plurality of receivers and said means for determining location of said movable transmitter.

41. The transmitter location system of claim 24, further comprising:
  a defined functional area, whereby movable transmitter is selectively activated to send functions to a computer.

42. The location system of claim 24, wherein said second output signal contains encoded information regarding said movable device.

43. The location system of claim 42, wherein said encoded information includes a determined color of said movable device.

44. The location system of claim 42, wherein said encoded information includes a determined line width of said movable device.

45. The location system of claim 42, wherein said encoded information includes a determined line style of said movable device.

46. The location system of claim 42, wherein said encoded information includes a user identification of said movable device.

47. A process for calculating a location a transmitter pen relative to a surface, comprising the steps of:
  repeatedly sending a first output signal having a first speed of propagation from said transmitter pen to at least one of a plurality of external receivers;
  repeatedly sending a second output signal having a second speed of propagation different from said first speed of propagation of said first output signal from said transmitter pen to each of said plurality of external receivers;
  comparing said second output signal received at each of said plurality receivers to a stored prior second output signal received at each of said plurality receivers to determine a time of arrival of said second output signal at each of said plurality receivers;

determining a distance from said transmitter pen to each of said plurality of external receivers based on said time of arrival of said first output signal and determined time of arrival of said second output signal; and determining said location of said transmitter pen based upon said determined distance from said transmitter pen to each of said plurality of external receivers.

48. The process of claim 47, wherein said stored prior transmitted said second output signal is a digitized prior transmitted said second output signal.

49. The process of claim 47, wherein said step of comparing compares said second output signal received at each of said plurality receivers to a plurality of said stored prior second output signals received at each of said plurality receivers to calculate distance from said movable transmitter to each of said plurality of receivers.

50. The process of claim 47, wherein said step of comparing said second output signal and said stored prior second output signal is programmable.

51. The process of claim 47, wherein said second output signal and said stored prior transmitted said second output signal include a repeatable feature, and wherein said step of comparing compares said repeatable feature of said second output signal and said stored prior transmitted said second output signal.

52. The process of claim 47, wherein said surface is a white board.

53. The process of claim 47, wherein said first output signal is an electromagnetic output signal.

54. The process of claim 47, wherein said first output signal is an infrared output signal.

55. The process of claim 47, wherein said first output signal has a first signal state and a second signal state.

56. The process of claim 55, wherein said first signal state corresponds to a pen up position of said transmitter pen, and wherein said second signal state corresponds to a pen down position of said transmitter pen.

57. The process of claim 47, wherein said first output signal contains encoded information regarding said transmitter pen.

58. The process of claim 57, wherein said encoded information includes a determined color of said transmitter pen.

59. The process of claim 57, wherein said encoded information includes a determined line width of said transmitter pen.

60. The process of claim 57, wherein said encoded information includes a determined line style of said transmitter pen.

61. The process of claim 58, wherein said encoded information includes a user identification of said transmitter pen.

62. The process of claim 47, wherein said second output signal is an ultrasound transmission signal.

63. The process of claim 47, further comprising the step of:
providing a wireless connection between said plurality of receivers and a signal processor.

64. The process of claim 47, further comprising the step of:
defining a functional area on said surface, whereby said transmitter pen is selectively activated to send information to a computer.

65. The process of claim 47, wherein said second output signal contains encoded information regarding said transmitter pen.

66. The process of claim 65, wherein said encoded information includes a determined color of said transmitter pen.

67. The process of claim 65, wherein said encoded information includes a determined line width of said transmitter pen.

68. The process of claim 65, wherein said encoded information includes a determined line style of said transmitter pen.

69. The process of claim 65, wherein said encoded information includes a user identification of said transmitter pen.

70. A system for locating a movable transmitter, comprising:

an first output signal sensor for receiving a repeated first output signal having a first speed of propagation from said movable transmitter;

a plurality of second output signal sensors for receiving a repeated second output signal having a second speed of propagation different from said first speed of propagation, from said movable transmitter, wherein time to reach each of said plurality of sensors is dependent on a calculated distance between said movable transmitter and each of said plurality of sensors; and a signal processor in communication with said first output signal sensor and said plurality of second output signal sensors, whereby said signal processor determines location of said movable transmitter, using said first output signal, said second output signals and stored prior transmitted said second output signals to calculate distance from said movable transmitter to each of said plurality of second output signal sensors.

71. The system of claim 70, wherein said signal processor compares waveform features between said second output signal and said stored digitized prior said transmitted second output signal.

72. The system of claim 70, wherein said signal processor compares waveform features between said second output signal and a plurality of said stored digitized prior said transmitted second output signals.

73. The system of claim 70, wherein said signal processor normalizes said second output signal and said stored digitized prior said transmitted second output signal.

74. The system of claim 70, wherein said signal processor is programmable.

75. The system of claim 70, wherein said first output signal is an electromagnetic output signal.

76. The system of claim 70, wherein said first output signal is an infrared output signal.

77. The system of claim 70, wherein said first output signal has a first signal state and a second signal state.

78. The system of claim 77, wherein said movable transmitter is located in a transmitter pen, wherein said first signal state corresponds to a pen up position of said transmitter pen, and wherein said second signal state corresponds to a pen down position of said transmitter pen.

79. The system of claim 70, further comprising:
a wireless connection between said plurality of receivers and said means for determining location of said movable transmitter.

80. The system of claim 70, further comprising:
a defined functional area, whereby movable transmitter is selectively activated to send functions to a computer.

81. The system of claim 70, wherein said first output signal contains encoded information regarding said movable transmitter.

82. The system of claim 81, wherein said encoded information includes a determined color of said movable transmitter.

83. The system of claim 81, wherein said encoded information includes a determined line width of said movable transmitter.

84. The system of claim 81, wherein said encoded information includes a determined line style of said movable transmitter.

85. The system of claim 81, wherein said encoded information includes a user identification of said movable transmitter.

86. The system of claim 70, wherein said second output signal is an ultrasound transmission signal.

87. The system of claim 70, wherein said second output signal contains encoded information regarding said movable transmitter.

88. The system of claim 87, wherein said encoded information includes a determined color of said movable transmitter.

89. The system of claim 87, wherein said encoded information includes a determined line width of said movable transmitter.

90. The system of claim 87, wherein said encoded information includes a determined line style of said movable transmitter.

91. The system of claim 87, wherein said encoded information includes a user identification of said movable transmitter.

* * * * *